US007366859B2

(12) United States Patent
Per et al.

(10) Patent No.: US 7,366,859 B2
(45) Date of Patent: Apr. 29, 2008

(54) FAST INCREMENTAL BACKUP METHOD AND SYSTEM

(75) Inventors: Yuri S. Per, Moscow (RU); Maxim V. Tsypliaev, Moscow (RU); Maxim V. Lyadvinsky, Moscow (RU); Alexander G. Tormasov, Moscow (RU); Serguei M. Beloussov, Singapore (SG)

(73) Assignee: Acronis Inc., Tortola (VG)

( * ) Notice: Subject to any disclaimer, the term of this patent is extended or adjusted under 35 U.S.C. 154(b) by 300 days.

(21) Appl. No.: 11/244,298

(22) Filed: Oct. 6, 2005

(65) Prior Publication Data

US 2007/0083722 A1    Apr. 12, 2007

(51) Int. Cl.
*G06F 12/16* (2006.01)
(52) U.S. Cl. .......................................... 711/162; 714/6
(58) Field of Classification Search ...................... None
See application file for complete search history.

(56) References Cited

U.S. PATENT DOCUMENTS

| | | | |
|---|---|---|---|
| 5,649,152 A | | 7/1997 | Ohran et al. |
| 5,765,173 A | * | 6/1998 | Cane et al. .................. 707/204 |
| 5,835,953 A | | 11/1998 | Ohran |
| 5,905,990 A | | 5/1999 | Inglett |
| 5,990,810 A | * | 11/1999 | Williams ...................... 341/51 |
| 6,618,736 B1 | | 9/2003 | Menage |
| 6,665,815 B1 | | 12/2003 | Goldstein et al. |
| 7,152,165 B1 | * | 12/2006 | Maheshwari et al. ........ 713/193 |
| 7,206,795 B2 | * | 4/2007 | Bono .......................... 707/203 |
| 2005/0138091 A1 | * | 6/2005 | Bono .......................... 707/205 |
| 2005/0138195 A1 | * | 6/2005 | Bono .......................... 709/231 |
| 2005/0193235 A1 | * | 9/2005 | Sandorfi et al. ................ 714/6 |
| 2006/0123249 A1 | * | 6/2006 | Maheshwari et al. ........ 713/193 |
| 2006/0123250 A1 | * | 6/2006 | Maheshwari et al. ........ 713/193 |

* cited by examiner

Primary Examiner—Kevin Verbrugge
(74) Attorney, Agent, or Firm—Bardmesser Law Group (57) ABSTRACT

A method of incremental backup of a storage device includes reading descriptors of logical storage units of the storage device; comparing the descriptors of the logical storage units of the storage device with descriptors of archived logical storage units; for logical storage units of the storage device whose descriptors are not identical to the descriptors of the archived logical storage units, backing up contents of physical storage units that correspond to those logical storage units of the storage device; and, for logical storage units of the storage device whose descriptors are identical, performing a comparison step to check if these logical storage units need to be backed up. The logical storage units can be files. The comparison step can be, e.g., (1) bit-wise comparison of the logical blocks, (2) comparing control sums of the logical blocks, and (3) comparing log files relating to the logical storage units The physical storage units can be blocks. The descriptors can be, e.g., MFT entries, hash function values, timestamps, checksums, and file metadata. The descriptors can be compared on a physical storage unit basis. The method further can optionally include generating a bitmap of the physical storage units of the storage device; marking, in the bitmap, those physical storage units that correspond to logical storage units with different descriptors; and archiving content of the physical storage units marked in the bitmap. The method can further optionally include archiving logical storage units of the storage device having the same name as corresponding archived logical storage units of the storage device, but different time stamps.

20 Claims, 4 Drawing Sheets

FAST INCREMENTAL BACKUP METHOD AND SYSTEM

BACKGROUND OF THE INVENTION

1. Field of the Invention

The present invention relates to archiving and copying of data, and more particularly, to archiving of hard disk drive (HDD) data at various predetermined points in time.

2. Description of the Related Art

Currently, there are a number of conventional methods that relate to organization of data archiving. One of these is a backup of the entire hard drive, which typically involves copying of the hard drive content onto some other medium, such as another hard disk drive, a DVD ROM, a DVD RAM, a flash disk, etc. The primary disadvantage of such a method is the need to backup what is frequently a very large amount of data, which, on the one hand, results in a relatively lengthy process of archiving, and, on the other hand, frequently requires relatively large available space for the archived data. This ultimately results in a relatively high cost of archiving per unit of archived data.

Another approach is often referred to as "incremental backup," which generally decreases the amount of space required for the archiving. With the incremental backup, typically the contents of the hard disk drive is archived, or stored somewhere once. After that, only that data that has been changed, or added, since the previous backup, or since the pervious incremental backup, is actually archived. Recovery of data from the archive typically involves merging of the original backup and the various incremental backups.

There are generally two conventional approaches to implementing the incremental backup. One approach is to archive data in the form of logical structures, such as files. The second approach is to preserve the physical structures as they are represented on a storage medium. In other words, in the second case, sectors, clusters, and other physical data blocks are archived.

Despite the fact that incremental backup on a logical level makes it easier to identify data that is subject to archiving, in a number of situations, this approach is unacceptable. For example, backup on a physical level provides an ability to restore the functionality of the computing system, since it is possible to restore hidden and otherwise unmovable data blocks, for example, hidden and system areas of the disk, including boot areas.

At the same time, incremental backup on a physical level requires identifying the blocks that are subject to archiving, in other words, identifying blocks whose content did not change since the prior archiving operation. When data block level comparison level is used, this task requires a considerable time and CPU resources, both for data block comparison and for extraction of previously archived data blocks from the archive.

Accordingly, there is a need in the art for an effective and efficient method of identifying data blocks that are not subject to archiving, which minimal time and effort.

SUMMARY OF THE INVENTION

Accordingly, the present invention is related to a fast incremental backup method and system that substantially obviates one or more of the disadvantages of the related art.

In one aspect, there is provided a method of incremental backup of a storage device, including (a) selecting an area of the storage device for backup; (b) reading descriptors of logical storage units of the selected area; (c) comparing the descriptors of the logical storage units of the selected area with descriptors of already archived logical storage units; (d) for physical storage units of logical storage units of the selected area whose descriptors are not identical to the descriptors of the archived logical storage units, checking if these physical storage units need to be backed up; and (e) backing up contents of physical storage units identified in step (d).

The logical storage units can be files. The comparison step can be, e.g., (1) bit-wise comparison of the logical blocks, (2) comparing control sums of the logical blocks, and (3) comparing log files relating to the logical storage units. The physical storage units can be blocks. The descriptors can be, e.g., MFT entries, hash function values, timestamps, checksums, and file metadata. The descriptors can be compared on a physical storage unit basis. The method can optionally include generating a bitmap of the physical storage units of the storage device; marking, in the bitmap, those physical storage units that correspond to logical storage units with different descriptors; and archiving content of the physical storage units marked in the bitmap. The method can optionally include archiving logical storage units of the storage device having the same name as corresponding archived logical storage units of the storage device, but different time stamps.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF EMBODIMENTS OF THE INVENTION

Reference will now be made in detail to the embodiments of the present invention, examples of which are illustrated in the accompanying drawings.

In order to make the archiving process more efficient, it is proposed to form a backup on a physical level, and in addition, to use information that characterizes the logical structure of the data storage device, such as a hard disk drive.

It should be noted that this approach, in some cases, does not always identify every single data block that is not subject to archiving. However, the proposed method, with a minimal expenditure of time and resources, provides for a guaranteed exclusion of a substantial majority of the blocks from archiving of those blocks that do not need to be archived. Subsequently, for those blocks were not excluded from archiving, and are therefore subject to archiving, it is possible to use traditional methods and other suggested mechanisms to further reduce the number of data blocks that are actually subject to archiving.

In order to implement the proposed methods, the following steps are utilized:

First, on a physical level, a complete (or partial) snapshot of the storage medium is formed, and a time stamp of the snapshot is recorded (although it is also possible to work without a time stamp, by using other descriptors, such as hash functions, discussed below, file metadata, file names, MFT contents, etc.). When a second archiving operation is performed, a bitmap of the data blocks of the hard disk drive is formed. For example, this can be a bitmap of data blocks that are subject to archiving, or a bitmap of used data blocks of the hard disk drive (i.e., blocks of the hard disk drive that contain useful data, rather than "empty" blocks, or free blocks).

During subsequent archiving of the hard disk drive, a comparison of the description of the logical structures of the drives is performed. This comparison characterizes the distribution of the data of the logical structures into data blocks. If the logical structures (including the addresses of the blocks) correspond to each other, the data blocks that are occupied by the corresponding logical structures are identified, and for these blocks, the corresponding bit in the bitmap is cleared.

At the same time, it is also possible to retain, in the incremental snapshots, those blocks that were previously archived. However, a substantial increase in the speed of identifying the blocks that do not need to be archived compensates for this. If it is necessary to reduce the downtime of the computing system or server, the advantages of the above approach are fairly substantial. In other words, comparing the time needed for a full backup with the time necessary for a bit-wise comparison of the data block's content (given the necessity of unarchiving of the contents of one or more copies of the data, and the time necessary to implement a single backup in the proposed approach), the advantages of the proposed approach are self-evident.

Note that logs or change journal entries can be used to at least partially exclude various logical structures from the analysis. In other words, the fact that journal entries exist in the logs means that some changes have been made to the data in the blocks or files, and, therefore, they do need to be backed up without further checks. In such a way those physical storage units may be excluded from the selected area, or may be included in the selected area if only some blocks of those files may be modified A file system such as NTFS creates an MFT and associated log file that records file transaction information and implements file system recoverability. Because the log file is a system file, it can be found early in the boot process and used to recover the disk volume, if necessary. When a user updates a file, the Log File Service records all metadata redo and undo information for the transaction. For recoverability, "redo" information in the log file allows NTFS to roll the transaction forward (repeat the transaction if necessary), and "undo" allows NTFS to roll the transaction back, if an error occurs.

The infinite log file: the log file is a circularly reused file. When a new record is added, it is appended to the end of the file. When the log file reaches its capacity, the Log File Service waits for writes to occur and frees space for new entries.

As may be seen from the above, the log file retains a description of only the latest transactions, which means that it can only be used as an auxiliary source of information, since it does not provide a guarantee of a consistent backup. Following that logic, by using the bitmap, it is possible to archive the marked blocks, in addition to a previously created archive.

Due to the fact that the final description is also subject to archiving, the modification of the bitmap and the archiving can take place simultaneously. For example, it is possible to archive MFT blocks simultaneously with verification of identity of the file structures of the archive blocks. Identical blocks of the original MFT and the current MFT are not archived. At the same time, in some cases, the identity of the blocks frequently is due to the identity of the corresponding files, although it is not a guarantee of that.

For files with distributed blocks, for example, in logical structures described by FAT16 and FAT32, the proposed method of backup organization also permits to considerably shorten the time necessary for checking of data blocks of the files. This is due to the fact that some of the files are excluded from this process, without any further need for subsequent checking of data block identity. In some cases, when the data block address is changed (for example, due to defragmentation process), it is possible to also change the address of the original cluster, as well as subsequent clusters. If this is done, no subsequent checking of the data blocks needs to be performed, which reduces the volume of computation necessary for the archiving, compared to a block by block comparison of the contents of the hard disk drive.

In some cases, it is possible to use a comparison of used blocks bitmap with current and previously stored states of the hard disk drive. In this case, blocks that were previously free are excluded from consideration, and are archived without any further examination of the contents of the data blocks.

In another case, the description of the logical structures can be compared not directly, but through a creation of additional data structures, and subsequent comparison of such data structures. For example, when forming a snapshot of logical structure descriptions, it is possible to convert them by, for example, using various transforming functions, such as hash functions. Hash functions are one example of algorithms that transform a string of bytes into a usually shorter value of a fixed length, that represents the original string. This is called a hash value. When hashing a data block, or a file, the contents is converted into a short bit string—a hash value—and it impossible to recover the original message from the hash value. A hash value is unique in the sense that two different files cannot result in the same bit. Therefore, only the values of the hash functions need to be preserved, and can be stored together with, or added to, the snapshot.

In order to determine the identity of the logical structures, the hash functions of the descriptors can be compared, as well as the hash functions of the descriptors of the current state of the hard disk drive. Also, in one embodiment, bit-wise comparison of the hash functions can be performed.

Depending on the length of the key that is generated by the hash operation, some other mechanisms may be added to verify blocks that should or should not be subject to archiving.

In fact, relatively short hash values may be generated and compared fairly rapidly. If hash values being compared are different, it shows that the hashed contents are different too. However, using a short hash key results in a non-zero probability that different contents may have the same hash function value. For example, if maximum hash function value is less then number of different data blocks (here, groups of physical storage units), different data blocks can have the same hash function. Therefore, when a possibility of omitting data required for archiving needs to be reduced to zero value, additional operation of comparing blocks with the same hash function values may be implemented to prove that the data blocks at issue really are the same.

If the hash key length is relatively long, this gives an acceptable guarantee that the data block with the same hash values are in fact the same, e.g., the MD5 function gives about $10^{37}$ different keys, and no additional comparing of data blocks with the same hash values required. In this case, however, physical storage units from data blocks with different hash values may be compared to exclude additional storage units from archiving, e.g., for saving archiving storage space.

The advantage of using hash value comparison is in that, first, it speeds up the comparison process, since the value of the hash function is much less in size than the data itself, and, second it permits simplification of comparison of fragmented data. In disk drive terminology, "structure(s)" may be used that emulates a tree structure with a set of linked nodes. Each node has zero or more child nodes, which are below it in the tree. A node that has a child is called the child's parent node. A child has at most one parent; a node without a parent is called the root node (or "root"). Usually a placeholder for storing root information concerning the file is fixed in length. In such cases, when the file descriptor has more bytes than the placeholder can hold, links or pointers to blocks that contain additional information are used. Such structures (leaf nodes) may be physically stored away from the root node, may be fragmented or may be changed without modifying the contents of the file, e.g., while changing long file name only. For example, descriptors of files, e.g., inodes, which can have links to indirect blocks and remote inodes in this case, the inodes are hashed, together with the indirect blocks, which permits a rapid comparison of the hash function values and also permits grouping of fragmented data sets.

In one example, for structures described in FAT16 and FAT32 with a possibility of file fragmentation, a significant characteristic of their logical structure description is not only the file length and the address of the first data block, but also the location of all the blocks of the file. This information can be extracted sequentially for all the blocks of the file, and hashed together with the hashing of the FAT. This approach can also be used in NTFS, to verify B-trees.

To implement the method, it is possible to use various approaches that suspend disk operations during the time that the archive is being formed. Single threaded run mode or single threaded disk access can be used. This can be accomplished by an operating system that maintains a single-threaded environment or by one that provides file system locking, and hence allows exclusive access. For example, the MS-DOS operating system provides exclusive file access because it is a single-threaded environment, at least from an application program's perspective. A Linux (or another UNIX-like) operating system can be used, utilizing system locks to provide exclusive access. While the Windows operating systems are multi-threaded, they can defer to MS-DOS, Linux or another single-threaded environment.

An archiving program according to the invention can begin execution in these multi-threaded environments, and then can pass control to a code that runs in DOS or Linux mode and thus provides exclusive disk access. Some operating systems also provide locks that ensure exclusive disk access.

Also, when practicing the method described above, the freezing, or suspension, of disk access can be replaced with other mechanisms for preserving the contents of the hard disk drive at the moment when the backup process begins. For example, it is possible to create an additional data structure that includes the contents of the data blocks as described in co-pending application Ser. No. 11/016,727, entitled System and Method for Incremental Backup of Local Drive Data, filed on Dec. 21, 2004, which is incorporated herein by reference in its entirety. Subsequently, this structure can be used as part of the incremental backup, or, alternatively, the contents of the data blocks can be moved into an incremental backup after checking it for necessity of archiving these blocks.

As yet another alternative, data that is subject to being written to the hard disk drive can be stored in some temporary data storage, with subsequent copying to the hard disk drive, once the formation of the incremental snapshot is completed.

From the perspective of the method described above, it is not critical exactly how files are organized into a logical structure, since the primary concern is how the file is described, rather than its location in the logical hierarchy. In other words, to establish identity of descriptions, it is possible to merely compare relevant file attributes. For instance, it is possible to compare the dates of changes to file contents, and ignore the dates of renaming of files, if the operating system permits this. Also, for files stored on a disk, it is possible to examine hash value functions of the file contents (e.g., MD 5 and SHA-1, which are two commonly used hash functions) and in the future, these values can be used for a preliminary analysis after identity is established based on file hashes and file descriptions. A more detailed comparison can then be made.

Note that the method described above is particularly applicable to file systems with contiguously arranged data blocks, for example, NTFS.

Since the file descriptions are used in formation of the backup, upon user request, some of the files can be excluded from the archiving process. Examples of data that may not be subject to backup include various swap and paging structures, temporary files, and various other files, as identified by the user. If identity is not determined it is possible to perform an additional check as to the reasons for why identity is not established. For example, if the file contains additional characteristics or metadata, which leads not to a change but to addition of other blocks to the file or, more commonly, to the file descriptor, (for example, the appearance of new data streams), the bitmap needs only to reset the bits that correspond to newer blocks of the file.

As another example, additions can be performed, and if no identity of the contents exists, the corresponding blocks are always archived.

Additionally, to avoid the necessity of copying of identical data blocks into the incremental backup, it is possible to have a second step in the verification of identity of the blocks. In this secondary verification, the contents of the blocks that were previously identified as not subject to archiving is compared. At the same time, the contents of the blocks that were identified in a log file need not be checked for whether they need to be archived.

In the case of the second step discussed above, blocks and/or clusters are grouped in some predetermined manner, and for these grouped blocks, hashes are generated, which are then compared. If the hashes are identical, the corresponding blocks are marked as not subject to archiving. If the hashes are not identical, additional verification checks of some of the blocks can be performed, for example, on a cluster by cluster basis.

The proposed method can also be used with generic file systems, such as ReiserFS, ext3, XFS, JFS and XenFS.

When a file is being moved form one folder to another, which only affects the entry in the MFT, the backup need not be made of the data, but only the MFT needs to be backed up, and the corresponding entries and descriptors of the file.

Since the MFT is approximately 10% of the hard disk drive or a partition, the volume of the data that is being compared or restored from a prior snapshot is significantly less compared to the entire drive. Only those blocks whose data has not been changed are not backed up. Therefore, some of the blocks in the incremental backup may be "extra."

Figure 1:
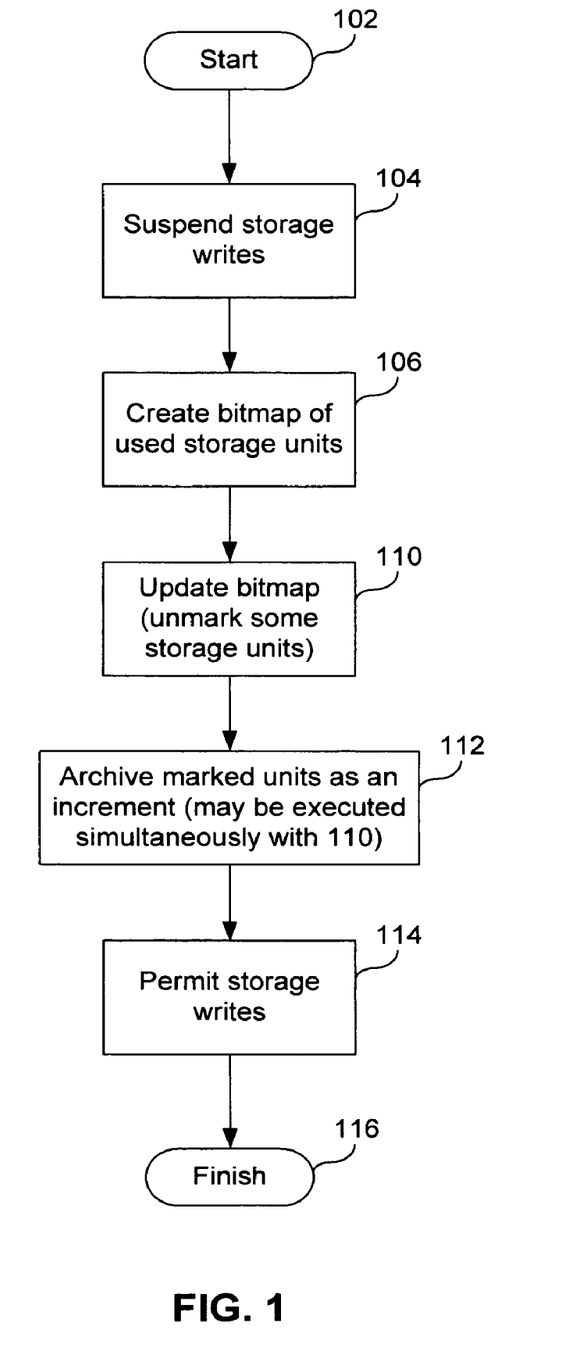
FIG. 1 illustrates one general exemplary method of the present invention.

FIG. 1 illustrates one exemplary method of the present invention. As shown in FIG. 1, after starting the archiving process (step 102), storage writes are suspended (step 104). A bitmap of used storage units (i.e., blocks or clusters or sectors) is created (step 106). In step 110, the bitmap is updated by unmarking some of the storage units that are not subject of incremental backup. Such storage units are, for example, physical blocks or clusters of storage device related to logical storage units with coincident descriptors. Also, other mechanisms of identifying physical storage units that should not be subject of archiving may be implemented, as discussed below. In step 112, units that are marked are archived as part of the incremental backup. This step may be executed simultaneously with step 110. In step 114, storage writes are again permitted, and the process finishes in step 116.

Figure 2:
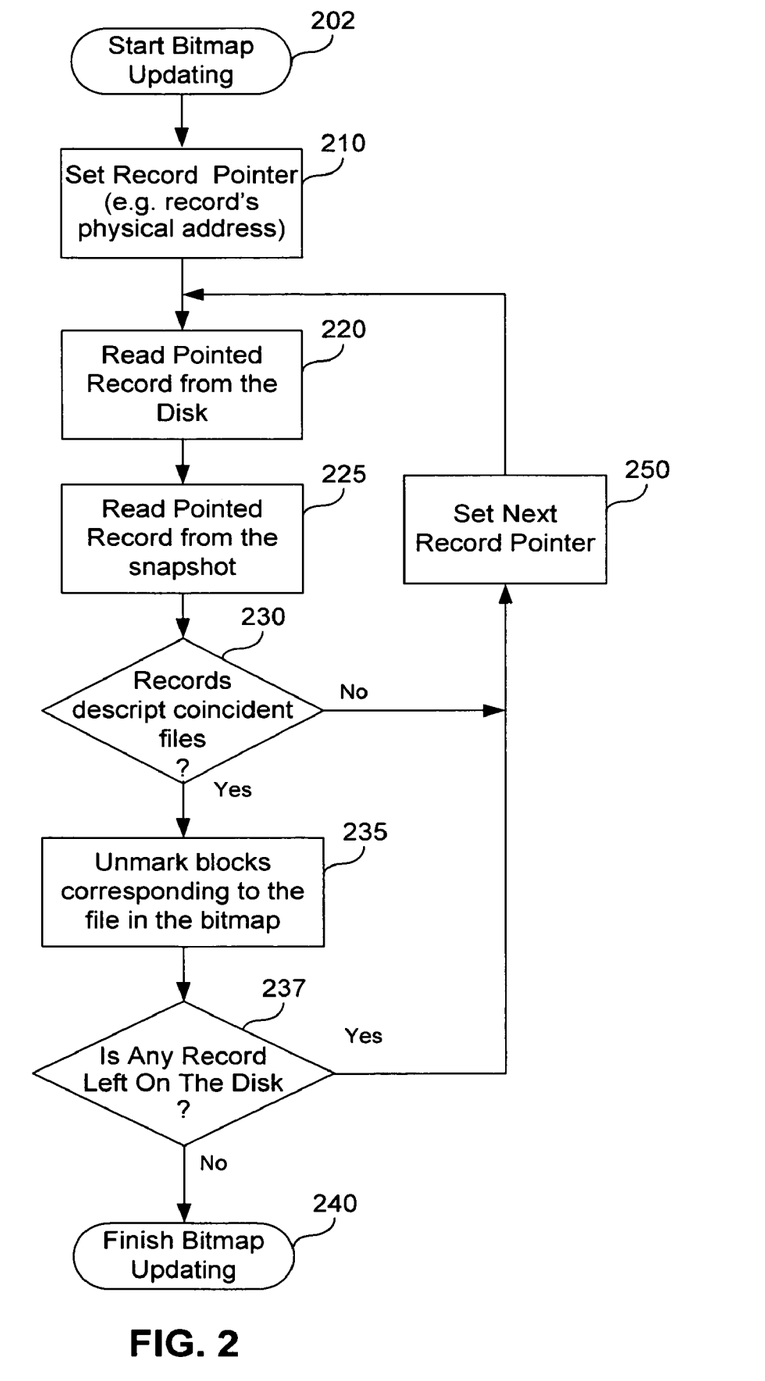
FIG. 2 illustrates identification of physical storage units that should not be subject of incremental backup.

FIG. 2 illustrates identification of physical storage units that should not be subject of incremental backup being described in a particular implementation of bitmap updating algorithm shown in FIG. 1 as step 110. In step 202, the bitmap updating process begins. It should be noted that the steps in FIG. 2 are described using records as examples. Such records store information that characterizes logical storage units. Examples of records may be physical storage blocks, or parts of MFT file that contains descriptors of files, or inodes, or other similar data objects. Commonly, descriptors of files are stored in the designated disk area, and logical descriptors are stored in the same blocks, if the descriptor is not changed. In this a case, the simplest way of comparing descriptors is comparing records, represented by the physical storage blocks of the designated area. The task of counting records involves, for example, consecutively incrementing designated block addresses and comparing contents of blocks with the same addresses that have been read from the storage device vs. those extracted from the previous backup structure. A direct comparison of corresponding blocks' content may be replaced with comparing hash function values, calculated for those blocks, or by any other appropriate method.

In step 210, the record pointer (e.g., address of an initial storage block) is set, in other words, the records physical address is identified. In step 220, the record to which the pointer points to is read from the disk. In step 225, the record to which the pointer points to is read from the snapshot. In step 230, comparing of descriptors of logical storage units is provided. Note then descriptors may be compared entirely or partially (for example, only file names, time stamps of file modification and physical addresses of files' clusters may be compared). In another embodiment, a procedure for comparing descriptors or portions of descriptors part may be implemented by calculating hash values for descriptors or their parts and comparing calculated hash values. If the answer is yes, i.e. descriptors are coincident, then in step 235 physical storage units of the logical storage units are unmarked in the bitmap, and further do not considered as a subject of incremental backup. If the answer is no, i.e. descriptor of logical storage unit was changed since previous backup, then corresponding physical storage units may be subject of the incremental backup. Then the process goes to step 235 to check if there are logical storage units being unexamined. If there are unexamined logical storage units, the next record pointer is set in step 250, and the process then proceeds back to step 220. If all the logical storage units from the selected area are examined, bit map updating is finished (step 240).

Some physical storage units outside the selected area may be archived without additional checking. Such units may be blocks or clusters of the MFT, blocks with partition information, blocks of files indicated in the log file described above, etc.

Additionally, it should be noted that after a defragmentation of the hard drive (or some other movement or relocation of the data blocks that does not affect their contents), the descriptors are changed to ensure that the new location of the data block is properly reflected in the corresponding descriptors and/or the bitmap. Therefore, movement of blocks may be properly analyzed during the update of the bitmap even if content of the file itself does not change.

Figure 3:
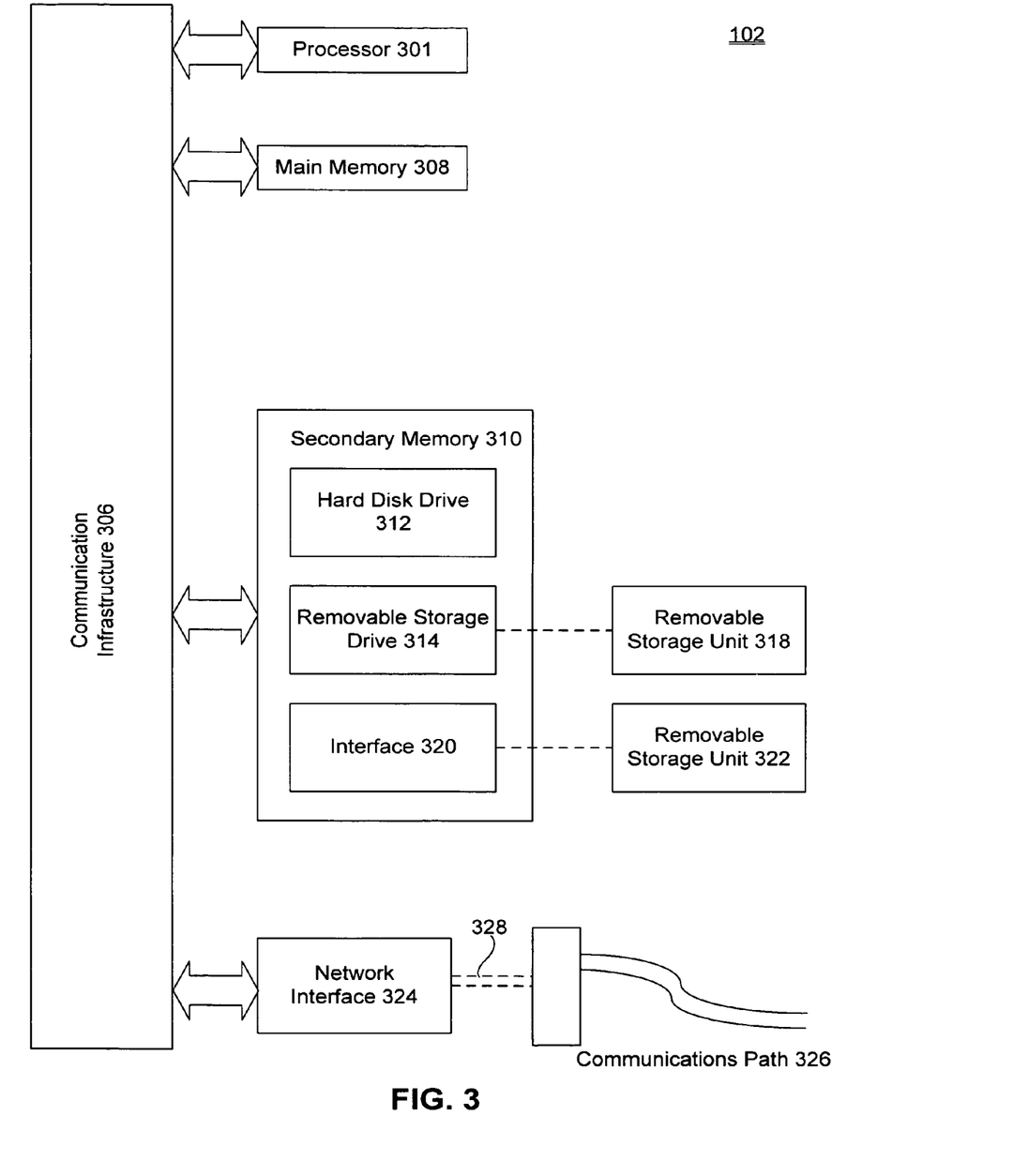
FIG. 3 is a schematic diagram of an exemplary computer or server that can be used in the invention.

An example of the computer 102 is illustrated in FIG. 3. The computer 102 includes one or more processors, such as processor 301. The processor 301 is connected to a communication infrastructure 306, such as a bus or network). Various software implementations are described in terms of this exemplary computer system. After reading this description, it will become apparent to a person skilled in the relevant art how to implement the invention using other computer systems and/or computer architectures.

Computer 102 also includes a main memory 308, preferably random access memory (RAM), and may also include a secondary memory 310. The secondary memory 310 may include, for example, a hard disk drive 312 and/or a removable storage drive 314, representing a magnetic tape drive, an optical disk drive, etc. The removable storage drive 314 reads from and/or writes to a removable storage unit 318 in a well known manner. Removable storage unit 318 represents a magnetic tape, optical disk, or other storage medium that is read by and written to by removable storage drive 314. As will be appreciated, the removable storage unit 318 can include a computer usable storage medium having stored therein computer software and/or data.

In alternative implementations, secondary memory 310 may include other means for allowing computer programs or other instructions to be loaded into computer 102. Such means may include, for example, a removable storage unit 322 and an interface 320. An example of such means may include a removable memory chip (such as an EPROM, or PROM) and associated socket, or other removable storage units 322 and interfaces 320 which allow software and data to be transferred from the removable storage unit 322 to computer 102.

Computer 102 may also include one or more communications interfaces, such as communications interface 324. Communications interface 324 allows software and data to be transferred between computer 102 and external devices. Examples of communications interface 324 may include a modem, a network interface (such as an Ethernet card), a communications port, a PCMCIA slot and card, etc. Software and data transferred via communications interface 324 are in the form of signals 328 which may be electronic, electromagnetic, optical or other signals capable of being received by communications interface 324. These signals 328 are provided to communications interface 324 via a communications path (i.e., channel) 326. This channel 326 carries signals 328 and may be implemented using wire or cable, fiber optics, an RF link and other communications channels. In an embodiment of the invention, signals 328 comprise data packets sent to processor 301. Information representing processed packets can also be sent in the form of signals 328 from processor 301 through communications path 326.

The terms "computer program medium" and "computer usable medium" are used to generally refer to media such as removable storage units 318 and 322, a hard disk installed in hard disk drive 312, and signals 328, which provide software to the computer 102.

Computer programs are stored in main memory 308 and/or secondary memory 310. Computer programs may also be received via communications interface 324. Such computer programs, when executed, enable the computer 102 to implement the present invention as discussed herein. In particular, the computer programs, when executed, enable the processor 301 to implement the present invention. Where the invention is implemented using software, the software may be stored in a computer program product and loaded into computer 102 using removable storage drive 314, hard drive 312 or communications interface 324.

Figure 4:
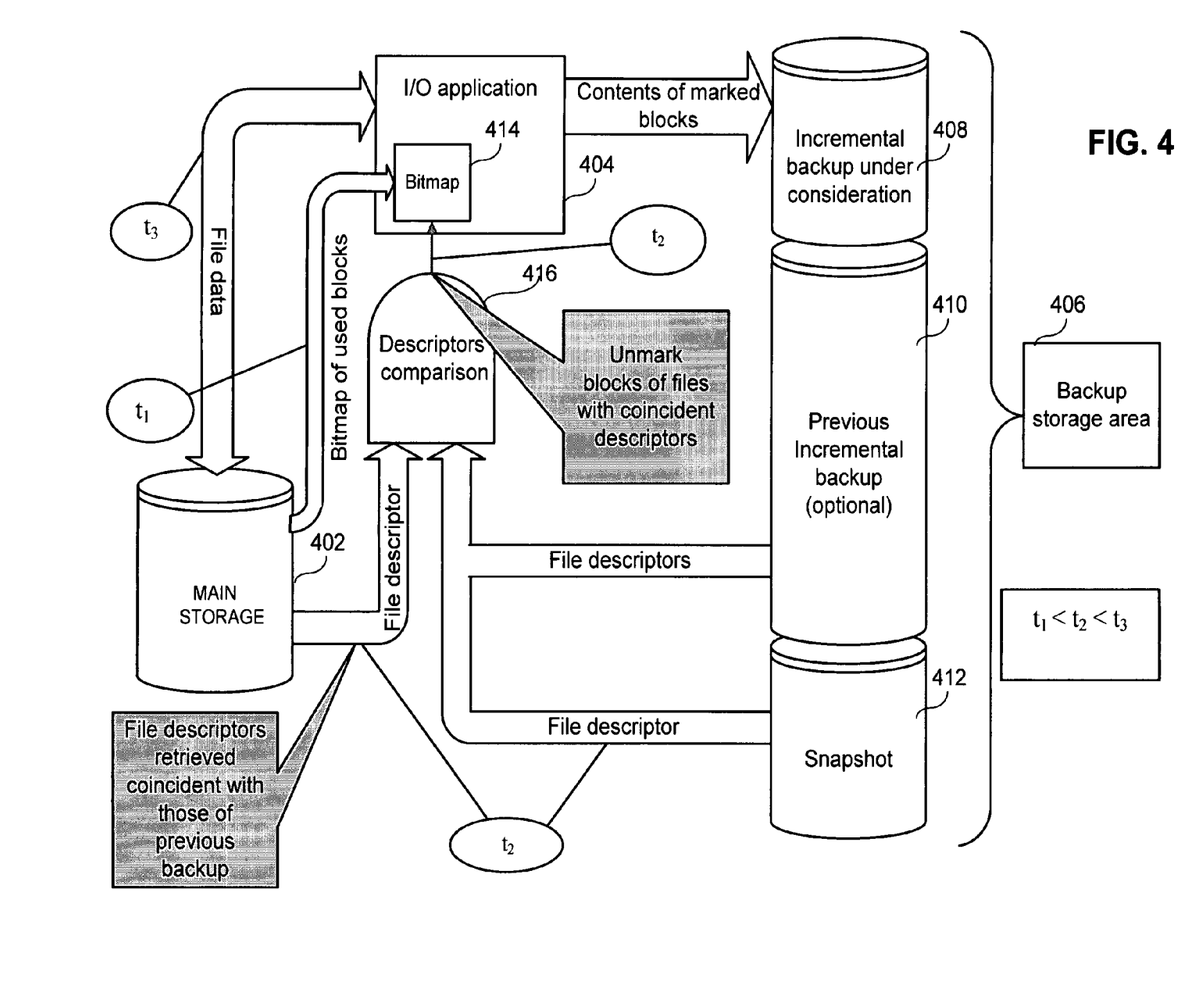
FIG. 4 is a schematic diagram of storage structures treatment according to one embodiment of the invention.

FIG. 4 illustrates a system block diagram of one embodiment of the invention. As shown in FIG. 4, a main storage 402 interfaces with an I/O application 414 for the purpose of backing up file data. The I/O application 404 maintains a bitmap 414, as discussed above, which keeps track of selected area of the disk, e.g. used blocks (i.e., blocks that contain useful data), or blocks of logical units that area not reflected in a log of changes. The latter may stay out of consideration, since it should be backed up in any way. A backed up data storage area 406 consists of at least a snapshot 412, a previous incremental backup 410, and the backup currently under consideration (408), based on the contents of the marked blocks. At time $t_1$ the bitmap is maintained based on the state of the main storage 402 then, at time $t_2$ the descriptors are compared (416) and after updating bitmap, at time $t_3$ content of marked physical storage units is transferred to incremental backup storage 408.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A method of incremental backup of a storage device, comprising:
   (a) generating a bitmap of selected physical storage units of a storage device, with all selected physical storage units marked;
   (b) selecting an area of the storage device for backup;
   (c) reading descriptors of logical storage units of the selected area;
   (d) comparing hash function values of the descriptors of the logical storage units of the selected area with hash function values of descriptors of already archived logical storage units;
   (e) for physical storage units related to logical storage units of the selected area whose descriptors are not identical to the descriptors of the archived logical storage units, based on step (d), checking if these physical storage units need to be backed up and unmarking, in the bitmap, those physical storage units that correspond to the archived logical storage units with coincident descriptors; and
   (f) backing up contents of physical storage units identified as marked in the bitmap in step (e).

2. The method of claim 1, further comprising backing up contents of physical storage units of the storage device outside the selected area.

3. The method of claim 1, wherein the logical storage units are files.

4. The method of claim 1, wherein the physical storage units are blocks or clusters.

5. The method of claim 1, wherein the descriptors are MFT entries.

6. The method of claim 1, wherein, step (e) further comprises generating hash function values for physical storage units and comparing the hash function values of the physical storage units for physical storage units of the storage device and already archived physical storage units, having the same addresses.

7. The method of claim 6, wherein the hash function value is generated for group of physical storage units.

8. The method of claim 6, wherein hash function generates relatively short hash function value, further comprising comparing blocks having identical hash function values.

9. The method of claim 6, wherein a control sum is used as a hash function value.

10. The method of claim 6, wherein hash function generates a long hash function value, further comprising step of comparing blocks from group with different hash function values.

11. The method of claim 1, wherein the descriptors include timestamps.

12. The method of claim 1, wherein the descriptors include checksums.

13. The method of claim 1, wherein the descriptors include file metadata.

14. The method of claim 1, wherein descriptors being content of some physical storage units, further comprising comparing the descriptors on a physical storage unit basis.

15. The method of claim 1, further comprising backing up content of at least some used physical storage units of the storage device lying outside the selected area.

16. The method of claim 15, wherein used physical storage units relate to the logical storage units of the storage device having the same name as corresponding archived logical storage units, but different time stamps.

17. The method of claim 1, further comprising archiving physical storage units of the logical storage units of the storage device having names that are not present the storage device wherein the archived physical storage units are not included to the selected area.

18. The method of claim 1, wherein step (d) comprises bit-wise comparison of the content physical storage units.

19. A system for incremental backup of a storage device, comprising:

(a) means for generating a bitmap of the selected physical storage units of the storage device, with all selected physical storage units marked;
(b) means for selecting an area of the storage device for backup;
(c) means for reading descriptors of logical storage units of the selected area;
(d) means for comparing hash function values of the descriptors of the logical storage units of the selected area with hash function values of the descriptors of already archived logical storage units;
(e) for physical storage units related to logical storage units of the selected area whose descriptors are not identical to the descriptors of the archived logical storage units, based on the comparison in (d), means for checking if these physical storage units need to be backed up and for unmarking, in the bitmap, those physical storage units that correspond to the archived logical storage units with coincident descriptors; and
(f) means for backing up contents of physical storage units identified in (e) as marked in the bitmap.

20. A system for incremental backup, comprising:
a main storage that includes physical storage units and logical storage units;
a bitmap of the selected physical storage units of the storage device, with all selected physical storage units marked;
an archive of a previous state of the main storage; and
a plurality of descriptors corresponding to the logical storage units,
wherein, for those logical storage units for those logical storage units whose hash function values of their descriptors are the same as hash function values of descriptors of archived logical storage units, are unmarked in the bitmap, and for those logical storage units whose hash function values of descriptors are not the same as hash function values of descriptors of archived logical storage units, an incremental backup is performed of corresponding physical storage units that are marked in the bitmap.

* * * * *